United States Patent
Bates et al.

(10) Patent No.: US 7,878,233 B2
(45) Date of Patent: Feb. 1, 2011

(54) AIR-TO-AIR AFTERCOOLER

(75) Inventors: Kent C. Bates, Chillicothe, IL (US); Jiubo Ma, Dunlap, IL (US); Rishabh Sinha, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 1042 days.

(21) Appl. No.: 11/394,079

(22) Filed: Mar. 31, 2006

(65) Prior Publication Data

US 2007/0227140 A1 Oct. 4, 2007

(51) Int. Cl.
F28F 3/02 (2006.01)

(52) U.S. Cl. .......................... 165/153; 165/41; 165/51; 165/76; 165/109.1; 165/133; 165/134.1; 165/149; 165/173; 165/175; 165/177; 165/178; 165/179; 165/180; 165/905; 60/599; 123/563; 29/890.043; 29/890.052; 29/890.054

(58) Field of Classification Search .................. 165/41, 165/51, 133, 134.1, 149, 173, 175, 178, 905, 165/109.1, 177, 179, 180, 76, 153; 60/599; 123/563; 29/890.043, 890.052, 890.054
See application file for complete search history.

(56) References Cited

U.S. PATENT DOCUMENTS

| | | | | |
|---|---|---|---|---|
| 2,952,445 | A | * | 9/1960 | Ladd ........................... 165/166 |
| 3,939,908 | A | * | 2/1976 | Chartet ....................... 165/149 |
| 4,119,144 | A | * | 10/1978 | Kun ............................ 165/175 |
| 4,274,483 | A | * | 6/1981 | Cottone et al. .............. 165/153 |
| 4,327,800 | A | | 5/1982 | Miller |
| 4,570,317 | A | * | 2/1986 | Veling et al. ............ 29/890.046 |
| 5,042,574 | A | * | 8/1991 | Cottone et al. ............... 165/133 |
| 5,152,144 | A | | 10/1992 | Andrie |
| 5,305,945 | A | | 4/1994 | Cottone et al. |
| 5,383,439 | A | | 1/1995 | Bock |
| 5,607,012 | A | * | 3/1997 | Buchanan et al. ........... 165/173 |
| 5,730,213 | A | | 3/1998 | Kiser et al. |
| 5,840,100 | A | | 11/1998 | Arencibia, Jr. |
| 5,845,705 | A | * | 12/1998 | Vinh et al. ................... 165/173 |
| 6,006,430 | A | * | 12/1999 | Fukuoka et al. ............. 165/149 |
| 6,009,936 | A | | 1/2000 | Kubota et al. |
| 6,109,344 | A | | 8/2000 | Higgins |
| 6,318,347 | B1 | | 11/2001 | Dicke et al. |
| 6,477,846 | B2 | | 11/2002 | Yundt, Jr. |
| 6,688,292 | B2 | | 2/2004 | Ruppel et al. |
| 6,948,455 | B2 | | 9/2005 | Ferguson et al. |
| 6,960,333 | B2 | | 11/2005 | Blanda, Jr. et al. |
| 7,628,199 | B2 | * | 12/2009 | Rothenhofer et al. ....... 165/146 |
| 2005/0006066 | A1 | | 1/2005 | Emrich et al. |
| 2005/0184132 | A1 | | 8/2005 | Shabtay |
| 2005/0257922 | A1 | | 11/2005 | Shabtay et al. |

FOREIGN PATENT DOCUMENTS

JP 07167579 A * 7/1995
WO WO 2004085947 A1 * 10/2004

* cited by examiner

*Primary Examiner*—John K Ford
(74) *Attorney, Agent, or Firm*—Finnegan, Henderson, Farabow, Garrett & Dunner LLP

(57) ABSTRACT

An air-to-air aftercooler may include at least one tube body configured to direct a flow of charged air, wherein the at least one tube body includes a first material. The air-to-air aftercooler may also include a header assembly coupled to ends of the at least one tube body. The header assembly may include a second different material.

15 Claims, 16 Drawing Sheets

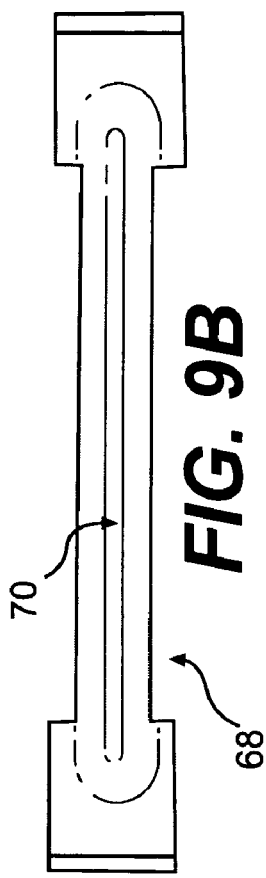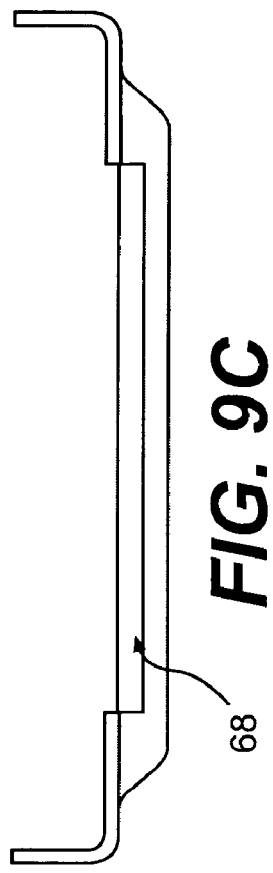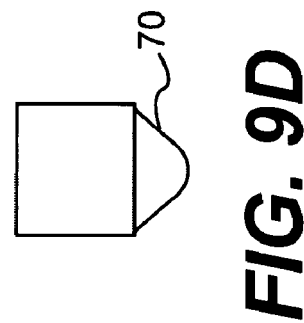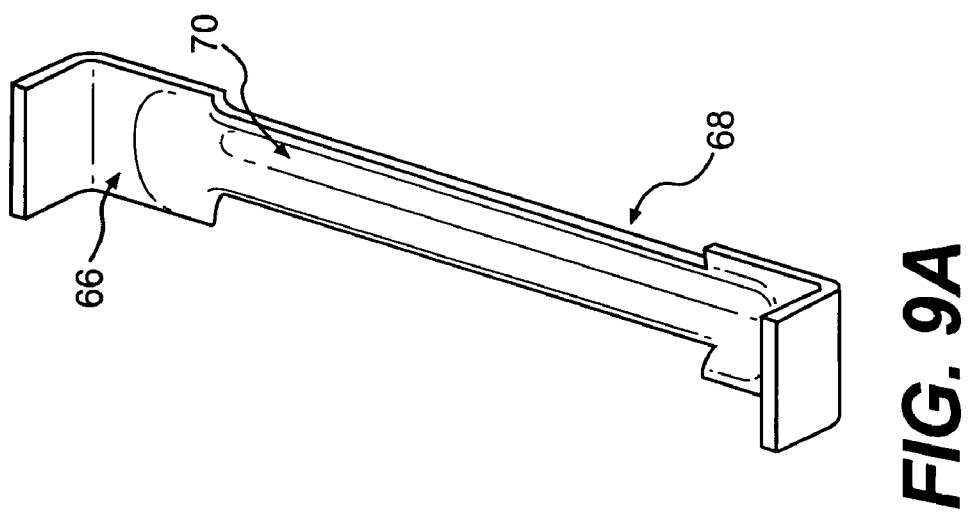
FIG. 9B
FIG. 9C
FIG. 9D
FIG. 9A

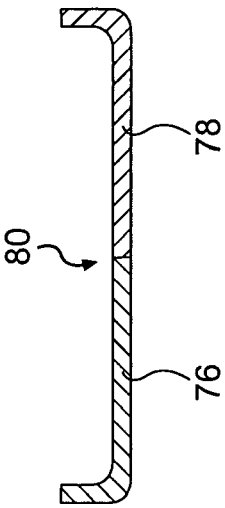
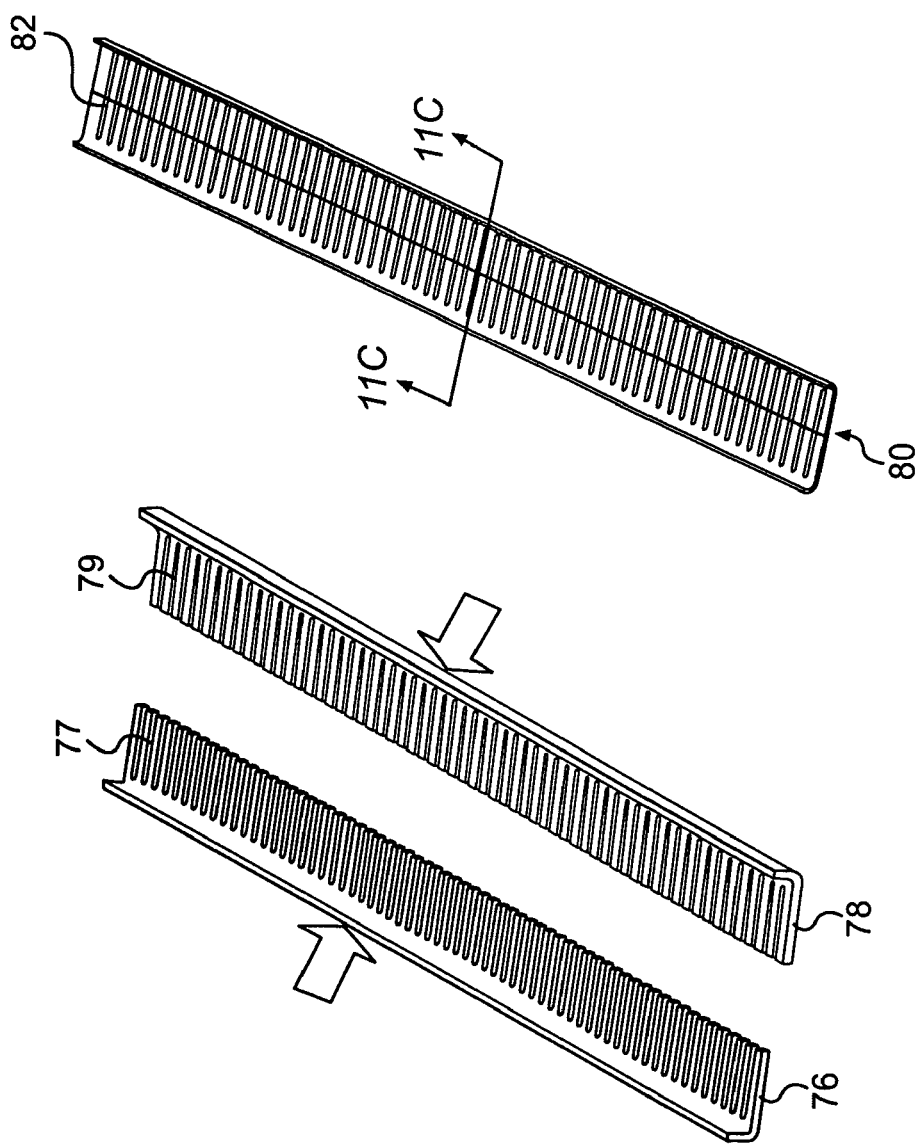
FIG. 11C
FIG. 11B
FIG. 11A

AIR-TO-AIR AFTERCOOLER

TECHNICAL FIELD

The present disclosure relates to air-to-air aftercoolers, and more particularly, to flow tube designs for air-to-air aftercoolers.

BACKGROUND

Construction and earthmoving equipment, as well as many other types of machines, are commonly used in a wide variety of applications. Generally, such machines may be powered by an internal combustion engine. In order to optimize the performance of the machine, the engine should perform as efficiently as possible. Various methods have been developed to increase internal combustion engine efficiency. One method has been to incorporate a turbocharger into the internal combustion engine. The turbocharger may compress air prior to entering an engine intake or combustion chamber. Supplying the engine intake with compressed air ("charged air") may allow for more complete combustion. This may result in lower emissions, improved performance, and better engine efficiency. However, compressing the air may also cause an increase in the intake air temperature. Supplying the engine intake with such heated charged air may lead to an undesirable increase in the amount of emissions exiting from the engine. Also, because engines may generally produce large quantities of heat already, adding heated charged air to the engine intake or combustion chamber may increase the operating temperature of the engine, thus resulting in excessive wear on engine components.

An air-to-air aftercooler (ATAAC) may be used to reduce smoke and other engine emissions by cooling the charged air before it enters the engine intake manifold. Using the ATAAC may also result in lower combustion temperatures, thus improving engine component life by reducing thermal stresses on the engine.

The ATAAC may include one or more tubes through which the heated charged air may pass. The outside of the tube may be subjected to some type of fluid, for example, ambient air, which may cool the tube. As the heated charged air passes through the tube, it may come into contact with the tube walls. Heat may be transferred from the charged air to the tube walls, and then from the tube walls into the ambient air, thus removing heat from the charged air. External fins may be added to the external surfaces of the tube walls to create greater surface area, which may provide improved heat transfer between the heated charged air and the ambient air.

In some traditional heat exchange systems, ATAAC components may be completely comprised of the same materials. One common material selection may include aluminum components having desired heat transfer properties. By way of example, these components may comprise tubings, fins, header assemblies, or manifolds. However, such aluminum components can be susceptible to corrosive effects within the operating environment. This can lead to shortened operational use of the ATAAC or require additional expense and/or downtime to service defective components of the ATAAC.

U.S. Pat. No. 5,730,213, issued to Kiser et al. ("Kiser") discloses a heat exchanger having aluminum cooling tubes including a plurality of agitating dimples projecting into the interior surface of the tubes. The aluminum cooling tubes are sealed in a jointed connection at opposite tube ends to respective header plates. Aluminum fins are disposed between parallel aluminum cooling tubes to enhance heat transfer from the tubes. However, the heat exchanger design of Kiser et al. may not address corrosion issues that can result from using aluminum tubes in heat exchanger systems.

The present disclosure is directed towards overcoming one or more of the problems set forth above.

SUMMARY OF THE INVENTION

In one aspect, the present disclosure may be directed to an air-to-air aftercooler. The air-to-air aftercooler may include at least one tube body configured to direct a flow of charged air, wherein the at least one tube body includes a first material. The air-to-air aftercooler may also include a header assembly coupled to ends of the at least one tube body. The header assembly may include a second different material.

In another aspect, the present disclosure may be directed to a method of making an air-to-air aftercooler tube. The method may include providing at least one tube body formed of a first material, wherein the at least one tube body is configured to direct a flow of charged air. The method may also include coupling a header assembly, formed of a second different material, to ends of the at least one tube body.

In yet another aspect, the present disclosure may be directed to an engine assembly. The engine assembly may include a turbocharger configured to compress intake air before it enters an engine air intake manifold. The engine assembly may also include an air-to-air aftercooler operatively connected between the turbocharger and the engine air intake manifold. The air-to-air aftercooler may include at least one tube assembly configured to direct a flow of charged air. The at least one tube assembly may include a tube body, a first structure configured to promote mixing of charged air passing through the at least one tube assembly, and a second structure configured to promote mixing of charged air passing through the at least one tube assembly. The first structure may include a first material and the second structure may include a second different material. The air-to-air aftercooler may also include fins coupled to an exterior surface of the tube body, wherein the fins include the second material. The air-to-air aftercooler may also include a header assembly coupled to ends of the at least one tube assembly, wherein the header assembly includes the second material. Furthermore, the air-to-air aftercooler may also include a plurality of side sheets coupled to each header assembly, wherein the plurality of side sheets include a third material different than the first and second material. Finally, the air-to-air aftercooler may also include a manifold coupled to each header assembly, wherein the manifold comprises the third material.

BRIEF DESCRIPTION OF THE DRAWINGS

FIGS. 9A-9D provide diagrammatic views of a modular header design according to an exemplary disclosed embodiment.

FIGS. 11A-11C provide diagrammatic views of a split header design according to an exemplary disclosed embodiment.

DETAILED DESCRIPTION

Figure 1:
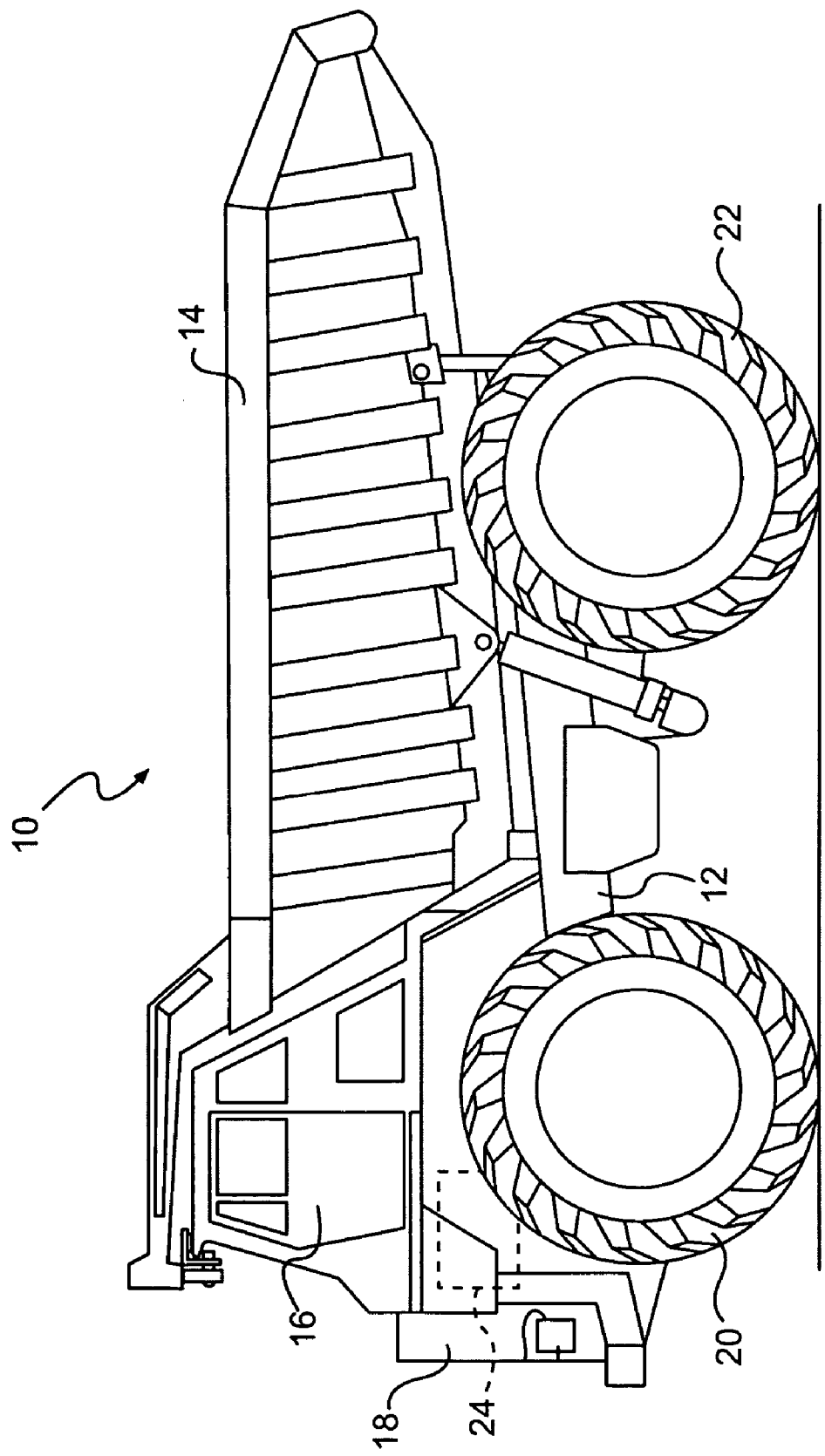
FIG. 1 provides a diagrammatic view of a machine according to an exemplary disclosed embodiment.

Referring to FIG. 1, a machine 10, such as an off-highway truck, is illustrated. Machine 10 may include a frame 12 and a dump body 14 pivotally mounted to the frame 12. An operator cab 16 may be mounted on the front of the frame 12 above an engine enclosure 18. Machine 10 may be supported on the ground by a pair of front tires 20 (one shown), and a pair of rear tires 22 (one shown).

Figure 2:
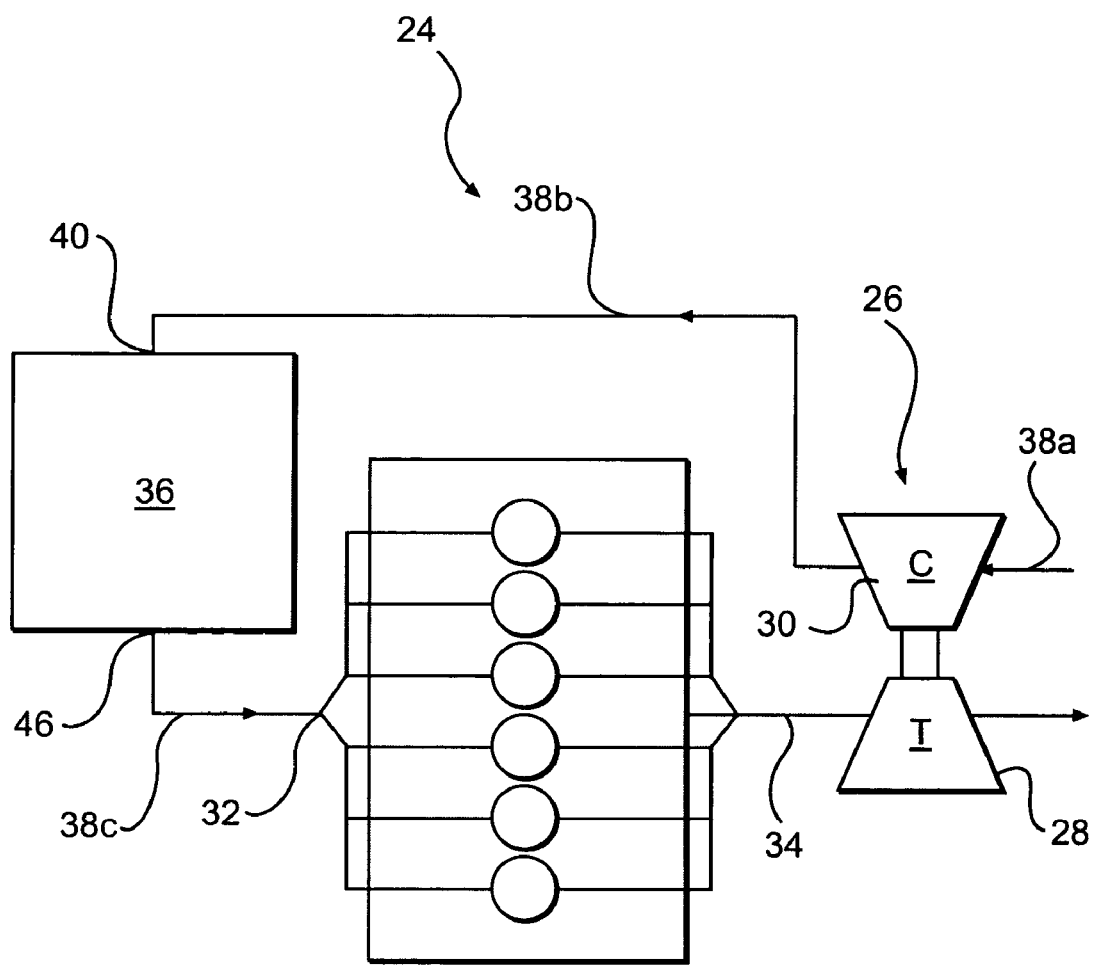
FIG. 2 provides a diagrammatic view of an engine according to an exemplary disclosed embodiment.

One or more engines 24 may be located within engine enclosure 18. An example of an engine 24 is shown in FIG. 2. Engine 24 may be any type of engine, for example, an internal combustion engine of the gas, diesel, and/or gaseous fuel type. Engine 24 may be used to provide power to a drive assembly of work machine 10, via a mechanical or electric drive train. Engine 24 may include a turbocharger 26 for compressing intake air 38a into heated charged air 38b, and an air-to-air aftercooler (ATAAC) 36 for cooling heated charged air 38b prior to entering an air intake manifold 32. Each of the engine sub-components may have a variety of configurations to suit a particular application. Exemplary sub-components of engine 24 will be discussed, but the presently disclosed concept is not limited to these specific configurations.

Turbocharger 26 may include a compressor 30, powered by a turbine 28 driven by engine exhaust flow 34. The compressor 30 may pressurize intake air 38a to allow a greater mass of fuel/air mixture in the engine cylinders of engine 24. The result may be an increase in power and improved engine efficiency. However, as a byproduct of pressurization, the temperature of intake air 38a may also increase, which may be undesirable. The compressed intake air exiting compressor 30 may be referred to as heated charged air 38b. As noted above, heated charged air 38b may be cooled prior to entering air intake manifold by passing through ATAAC 36.

Figure 3:
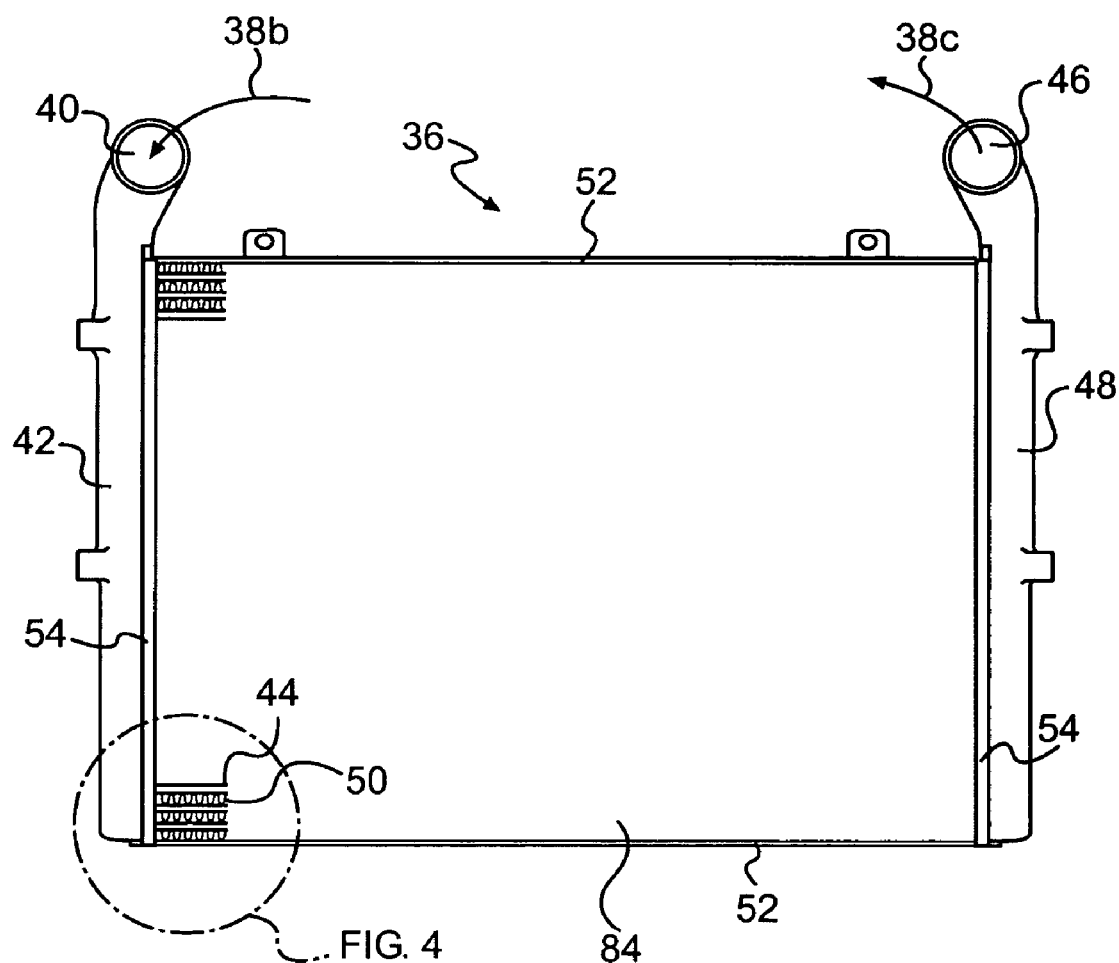
FIG. 3 provides a diagrammatic view of an air-to-air aftercooler according to an exemplary disclosed embodiment.

One exemplary disclosed embodiment of ATAAC 36 is shown in FIG. 3. Heated charged air 38b from compressor 30 of turbocharger 26 may be admitted into ATAAC 36 through an inlet port 40. Inlet port 40 forms a portion of an ATAAC inlet manifold 42 that directs heated charged air 38b into one or more tubes 44. After traversing ATAAC 36, and having undergone a heat exchange operation with respect to relatively cool ambient air simultaneously passing over and around ATAAC 36, the previously heated charged air 38b may be exhausted through an outlet port 46 of an ATAAC outlet manifold 48 as relatively cooled charged air 38c, which may then be routed to engine air intake manifold 32. As shown in FIG. 2, engine air intake manifold 32 of engine 24 may include one or more passages or pipes that may be used to conduct cooled charged air 38c to one or more engine cylinders.

In the exemplary disclosed embodiment shown in FIG. 3, ATAAC 36 may include a core assembly 84, an inlet manifold 42, and an outlet manifold 48. The core assembly may include an assembly of tubes 44, external fins 50, headers 54, and side sheets 52. Inlet manifold 42 and outlet manifold 48 are shown in connection with headers 54. Headers 54 may include a design such as one including one piece or a single component. In another exemplary embodiment, headers 54 may include a design such as one made from modular components which may be fitted together to form a unitary assembly.

The present disclosure includes the use of selected materials for the ATAAC 36 system. For example, stainless steel material may be utilized within ATAAC 36 in order to provide an amount of corrosion resistance to the overall design of the heat exchange system. A complete use of stainless steel components in ATAAC 36, however, may make the overall weight of the ATAAC 36 unacceptable. Hence, the use of lighter materials, such as aluminum, for other components of the ATAAC 36 may be desirable. The use of other materials, such as aluminum, in additional components may also facilitate achieving a desired cooling performance of ATAAC 36. Hence, as will be described in more detail below, the disclosed ATAAC 36 may be constructed of stainless steel material in combination with aluminum components. For example, in some disclosed embodiments, stainless steel components of ATAAC 36 may comprise tubes 44. Additionally, aluminum components of ATAAC 36 may comprise headers 54, external fins 50, side sheets 52, inlet manifold 42, and outlet manifold 48. While certain components, such as tubes 44, headers 54, external fins 50, side sheets 52, inlet manifold 42, and outlet manifold 48 of ATAAC 36, have been identified as including certain materials, the aforementioned components are not limited to these materials as individual components or collectively assembled within a final ATAAC 36 configuration. Selection of materials for various components, including, for example, tubes 44, headers 54, external fins 50, side sheets 52, inlet manifold 42, and outlet manifold 48 may vary based upon an overall consideration of the final ATAAC 36 assembly which balances, for example, a plurality of factors such as weight preferences, cooling performance, and resistance to corrosion. Hence, the combination of mixed components may provide superior performance by increasing cooling performance and reducing corrosion tendencies while, at the same time, addressing weight concerns and/or neutralizing condensation effects within ATAAC 36.

The use of components, for example, those including dissimilar materials, in the ATAAC design may present additional challenges for securing the dissimilar materials together in a final assembly. For example, some assembly operations for securing individual components of dissimilar materials, such as in an ATAAC design, may not meet prescribed production requirements. Hence, a method of the present disclosure may address assembly operations by providing materials which can make assembly of ATAAC 36 more efficient and/or cost effective.

The present disclosure may include a one-operation process for joining dissimilar materials to form a rigid assembly of components. One such method may include brazing or joining of metals through the use of heat and a filler metal (e.g., one whose melting temperature is above 840° F. (450° C.) but below the melting point of the metals being joined). The tensile strength of the brazed joint may exceed that of the metals being joined. In addition, brazed joints are generally ductile, i.e., generally able to withstand considerable shock and vibration such as those which may be generated during operation of machine 10.

In comparison with other joining operations, such as welding, for example, brazing requires relatively low temperatures for joining dissimilar materials. This may prevent overheating or melting the dissimilar materials, such as metals being joined, which could possibly distort or warp the base materials around the joined area. For relatively thin materials, for example, such as tubes 44 or external fins 50 (FIG. 3), reduction or elimination of distortions may be important in producing rigid connections that have high strength integrity.

The generation of higher temperatures (such as those produced by welding) may generally translate into higher operating costs (due to higher energy consumption). Employing brazing operations to ATAAC 36 assemblies may reduce operating expenditures since less heat would be required in brazing processes. Furthermore, brazed joints and/or assemblies generally produce good appearances. This may eliminate, or greatly reduce, additional finishing operations and associated expenditures.

Brazing operations may also be relatively easy to automate since, for example, a characteristic of brazing does not require precise synchronization of heat application and deposition of filler metal (such as is required in welding). Brazing operations are generally facilitated by broad heat applications and the ease of positioning a filler material. One of many methods for automatically providing heat to a joint may be employed. Additionally, the disclosed embodiment may utilized one of many available brazing layers or cladding as filler materials. Furthermore, a variety of methods for depositing filler metal materials may also be utilized. For example, in some embodiments, components of ATAAC 36 may contain aluminum cladding or a brazing layer. By utilizing these materials, manufacturing processes of the ATAAC design may be simplified such as by reducing assembly times in more simplified or reduced brazing operations. Furthermore, the resulting structure of ATAAC 36, in accordance with the present disclosure, may also provide increased strength of rigid connections of the components, thus, ensuing increased strength of the final assembly.

Figure 4:
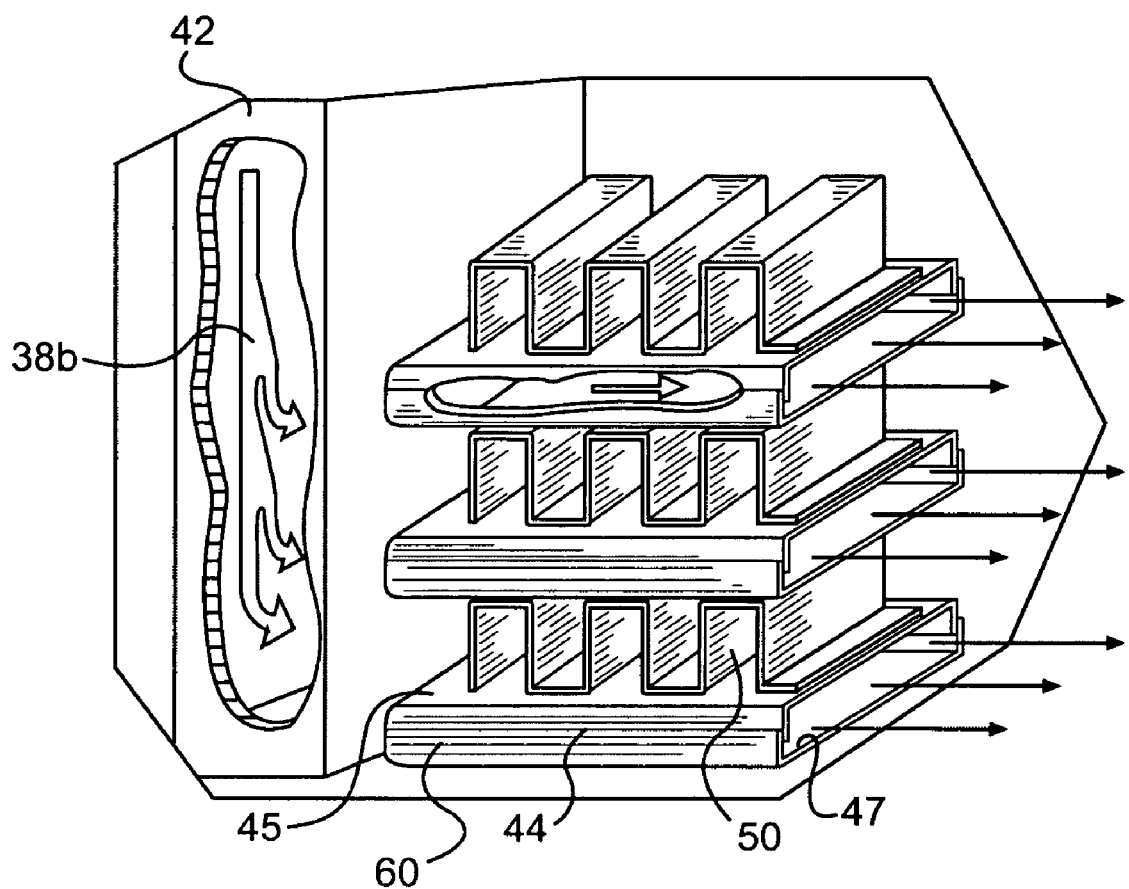
FIG. 4 provides a diagrammatic view of tubes and fins according to an exemplary disclosed embodiment.

In one exemplary disclosed embodiment, tubes 44 are shown enlarged in FIG. 4. Tubes 44 may be separated by external fins 50, which may be bonded to an exterior surface 45 of tubes 44 to increase their external surface area, thus aiding in heat transfer. External fins 50 may be formed from thin strips of metal, bent or otherwise formed into desired configurations. The configurations may allow for the free flow of ambient air across external fins 50, resulting in the ambient air removing heat from tubes 44 and external fins 50. External fins 50 may have any number of different configurations, including, for example, serpentine, saw tooth, louver, and wave shapes. One embodiment, shown in FIG. 4, depicts external fins 50 in a generally "U-shaped" pattern. External fins 50 may include aluminum with a brazing layer conducive to a brazing operation as discussed below.

Figure 5:
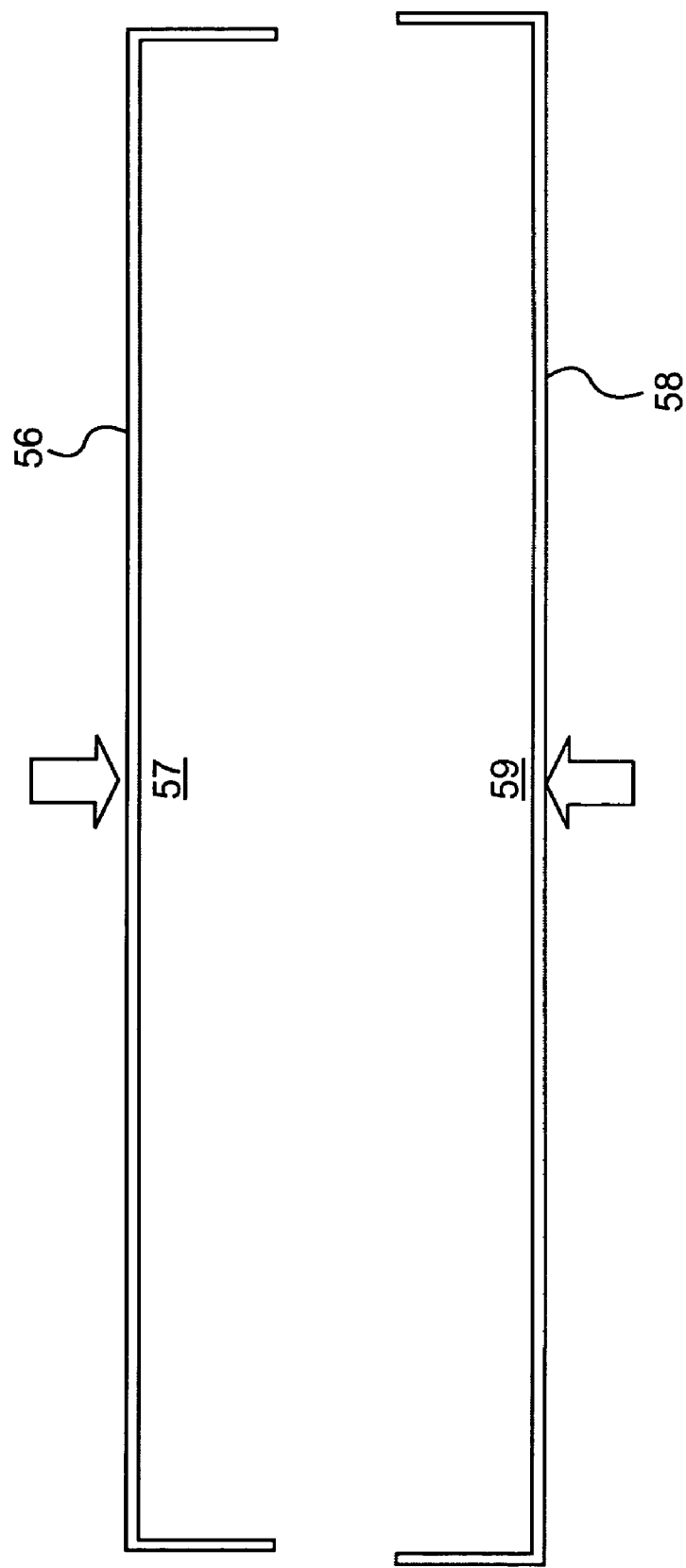
FIG. 5 provides a diagrammatic view of C-channels utilized in forming the tube of FIG. 4.

Turning to FIG. 5, an exemplary disclosed embodiment of components which form tubes 44 is shown. Separate components may be joined together to form a unitary tube body 60 (FIG. 4) of tubes 44. In some embodiments, the separate components may comprise a first C-channel 56, having an interior receiving region 57, and a second C-channel 58, having an interior receiving region 59. While two components, or C-channels, are shown in the exemplary disclosed embodiment of FIG. 5, two or more components may be utilized to form the unitary tube body 60 to generate tubes 44. The separate components, for example, first C-channel 56 and second C-channel 58, may be formed of aluminum cladded stainless steel. The aluminum cladded stainless steel material is conducive to forming the unitary tube body 60 of tubes 44 in a brazing operation as described below. While a brazing operation has been disclosed for joining first C-channel 56 and second C-channel 58 to form unitary tube body 60 in one exemplary embodiment, other suitable joining processes, such as laser welding, may be utilized.

Figure 6A:
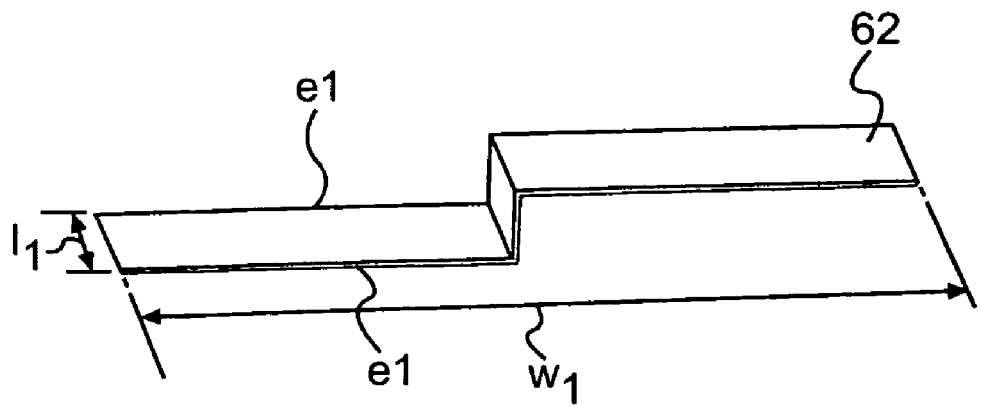
FIG. 6A provides a diagrammatic view of a turbulator according to an exemplary disclosed embodiment.
Figure 6B:
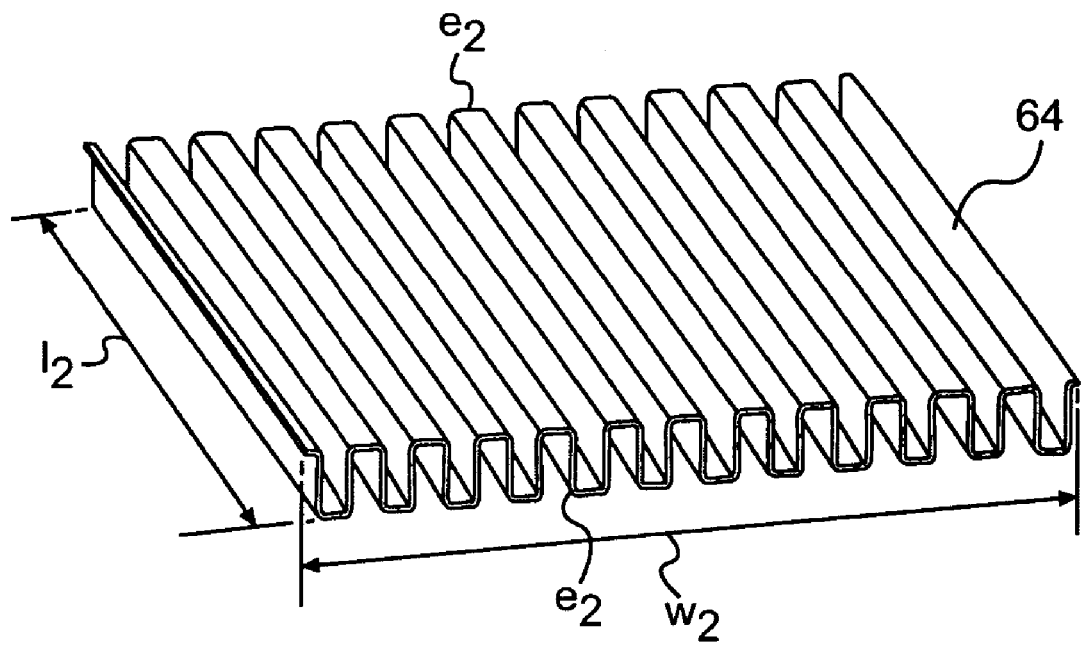
FIG. 6B provides a diagrammatic view of another embodiment of a turbulator according to an exemplary disclosed embodiment.

Each tube 44 may also include one or more devices to promote mixing of heated charged air 38b passing through tube 44. The aforementioned devices may include relatively thin strips of metal material, bent or otherwise formed into desired configurations and located within an interior 47 of tube 44 (FIG. 4). As shown, for example, in FIGS. 6A-6B, the aforementioned devices are depicted as first turbulator 62 and second turbulator 64. The first turbulator 62 and second turbulator 64 may facilitate creating turbulent flow within tube 44 in order to provide increased heat transfer between heated charged air 38b and tube 44 and fins 50. In one embodiment, first turbulator 62 may include stainless steel with aluminum cladding, while second turbulator 64 may include aluminum with a brazing layer. These materials are conducive to forming rigid connections within tube 44 as discussed below.

Both first turbulator 62 and second turbulator 64 may be formed into configurations for promoting mixing of heated charged air 38b passing through tube 44. For example, a final configuration of first turbulator 62 may include a bent "L" configuration over a width "$w_1$". Outer edges "$e_1$" run along width "$w_1$" of first turbulator 62. First turbulator 62 may also have an associated thickness covering a length "$l_1$". A final configuration of second turbulator 64 may include multiple bends forming a plurality of "U" configurations over a width "$w_2$". Outer edges "$e_2$" run along width "$w_2$" of second turbulator 64. The length of the plurality of "U" configurations may traverse a distance "$l_2$". In the embodiment shown, the thickness or length "$l_1$" of first turbulator 62 is shorter than the thickness or length "$l_2$" of second turbulator 64.

Figure 7A:
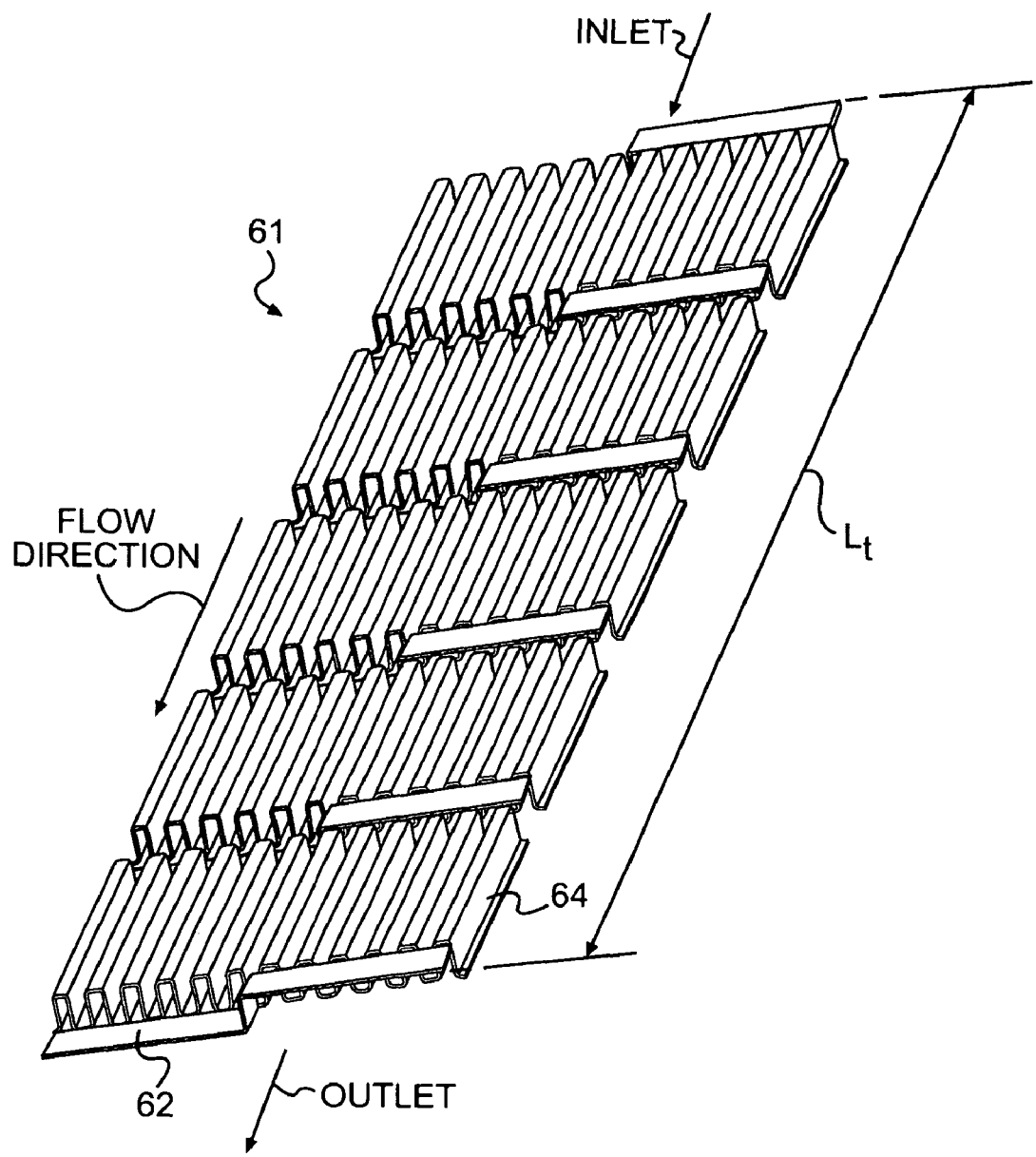
FIG. 7A provides a diagrammatic perspective view of an assembly of turbulators according to an exemplary disclosed embodiment.
Figure 8:
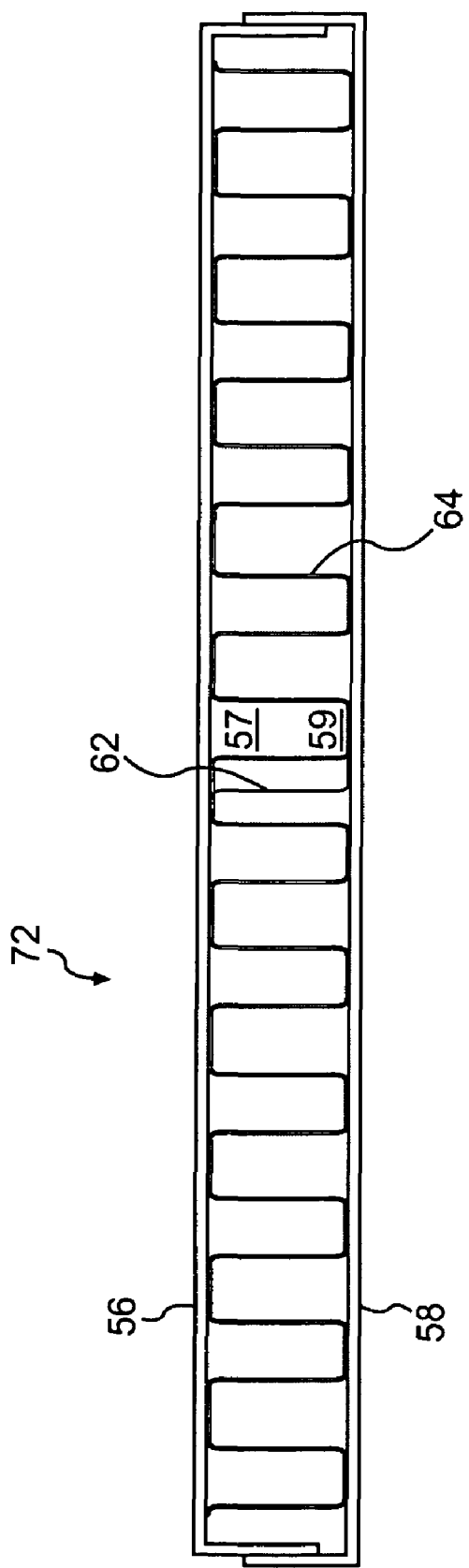
FIG. 8 provides a diagrammatic view of a tube and turbulator assembly according to an exemplary disclosed embodiment.

First turbulator 62 and second turbulator 64 may be combined to form patterns of turbulators inside tube 44. Hence, a final turbulator assembly disposed interior to tube 44 may create a final tube assembly 72 (FIG. 8). Turning to FIG. 7A, an alternating configuration of first turbulator 62 and second turbulator 64 is shown in an exemplary disclosed embodiment. Outer edges "$e_1$" of first turbulator 62 may abut against outer edges "$e_2$" of second turbulator 64 to form a non-complementary assembly of alternating turbulator patterns. This embodiment shows a pattern of alternating turbulator designs, beginning and ending with first turbulator 62. The alternating turbulator design, including first turbulator 62 and second turbulator 64, may traverse an overall length "$L_t$" of tube 44 (not shown) to form a first turbulator assembly 61.

Figure 7B:
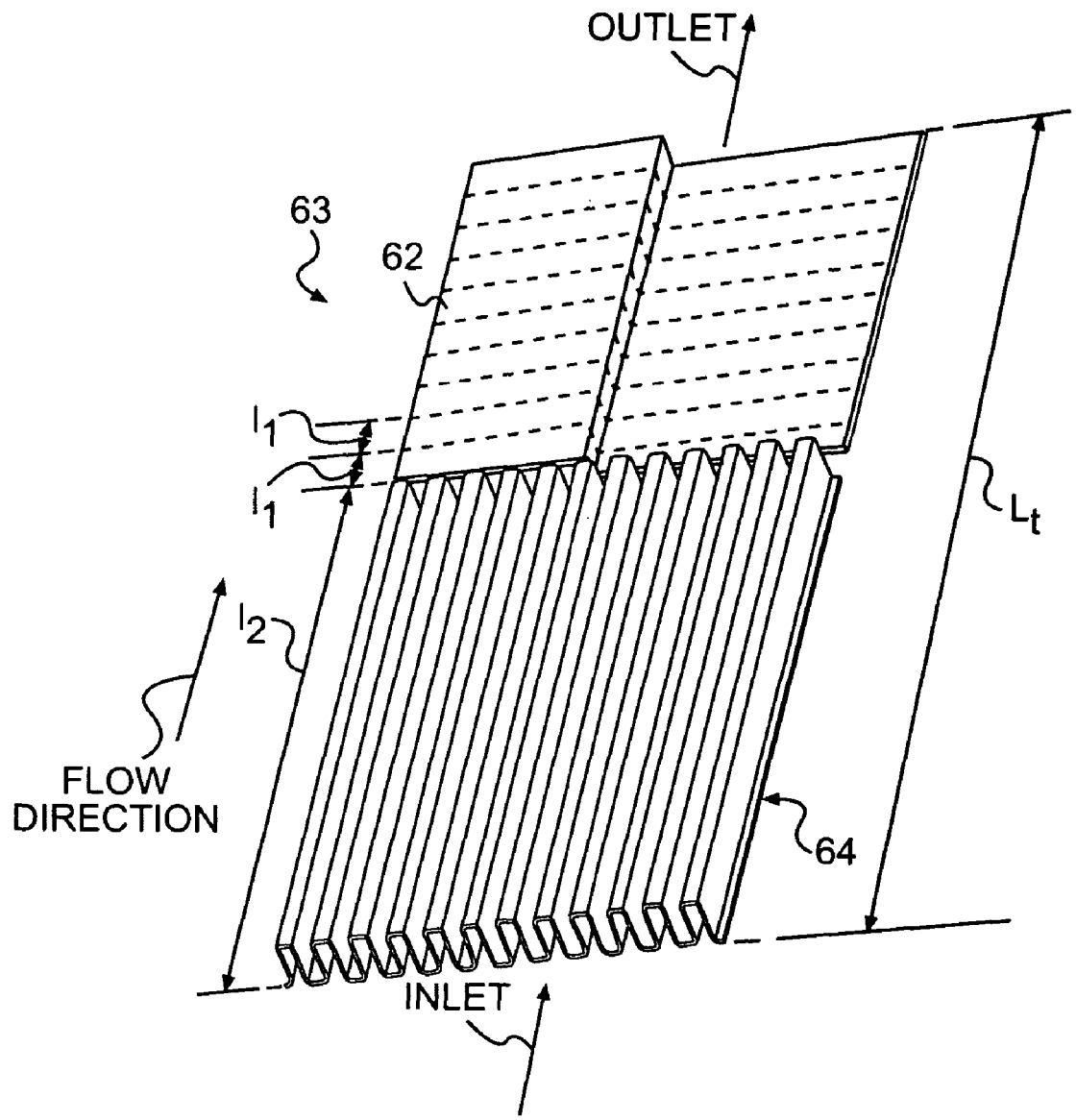
FIG. 7B provides a diagrammatic perspective view of another assembly of turbulators according to an exemplary disclosed embodiment.

An alternative configuration of a final turbulator assembly is shown in FIG. 7B. Again, first turbulator 62 and second turbulator 64 may be combined in a predetermined configuration over an overall length "$L_t$" to form a second assembly 63 that may be disposed interior to tube 44 (not shown). In this embodiment, second turbulator 64 is introduced at an inlet of tube 44 over a length "$l_2$". A successive number of first turbulators 62 may be placed in abutment beginning at an end length "$l_2$" of second turbulator 64 to form a non-complementary assembly of turbulator patterns. Thus, the successive number of first turbulators 62 may be arranged to conclude length "$L_t$" near an exit of tube 44 (not shown) in the second turbulator assembly 63 design. Hence, second turbulator assembly 63 includes a pattern of turbulators beginning with second turbulator 64 and ending with a successive number of first turbulators 62 over the flow direction.

FIG. 8 provides a diagrammatic view of a tube 44 enclosing first turbulator 62 and second turbulator 64 to create a final tube assembly 72. In one embodiment, second C-channel 58 may be fashioned slightly larger than first C-channel 56. A portion of a final turbulator assembly (e.g., first turbulator assembly 61 and second turbulator assembly 63) may be disposed within the interior receiving region 57 of first C-channel 56. The second C-channel 56 may be positioned to encapsulate the final turbulator assembly, for example, by disposing a portion of a final turbulator assembly and a portion of the first C-channel within the interior receiving region 59 of second C-channel 58.

Once the final turbulator assembly is encapsulated by first C-channel 56 and second C-channel 58 to form final tube assembly 72, a brazing operation may be implemented to rigidly retain the final turbulator assembly (e.g., first turbulator assembly 61 and second turbulator assembly 63) within first C-channel 56 and second C-channel 58. For example, brazing may occur along a surface of first turbulator 62 (including stainless steel with aluminum cladding) and an abutting surface of the second turbulator 64 (including aluminum with a brazing layer). Likewise, brazing may occur along a surface of first turbulator 62 (including stainless steel with aluminum cladding) and an abutting surface of first C-channel 56 (including aluminum cladded stainless steel) and second C-channel 58 (including aluminum cladded stainless steel). Furthermore, brazing may occur along a surface of second turbulator 64 (including aluminum with a brazing layer) and an abutting surface of first C-channel 56 and second C-channel 58 (including aluminum cladded stainless steel.)

The brazing operation may also serve to rigidly connect abutting surfaces of first C-channel 56 (including aluminum cladded stainless steel) and second C-channel 58 (including aluminum cladded stainless steel) to facilitate forming the final tube assembly 72. Alternatively, other processes suitable for rigidly connecting the abutting surfaces of first C-channel 56 and second C-channel 58 may be used. In one exemplary embodiment, for example, the aforementioned abutting surfaces may be connected by a laser welding operation.

Figure 10A:
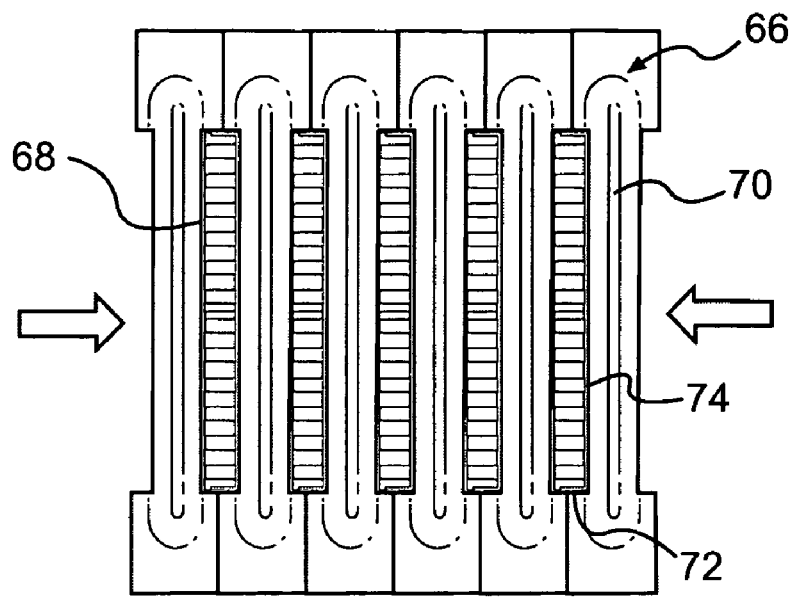
FIGS. 10A-10D provide diagrammatic views of the modular header and core assembly of the air-to-air aftercooler according to an exemplary disclosed embodiment.
Figure 10B:
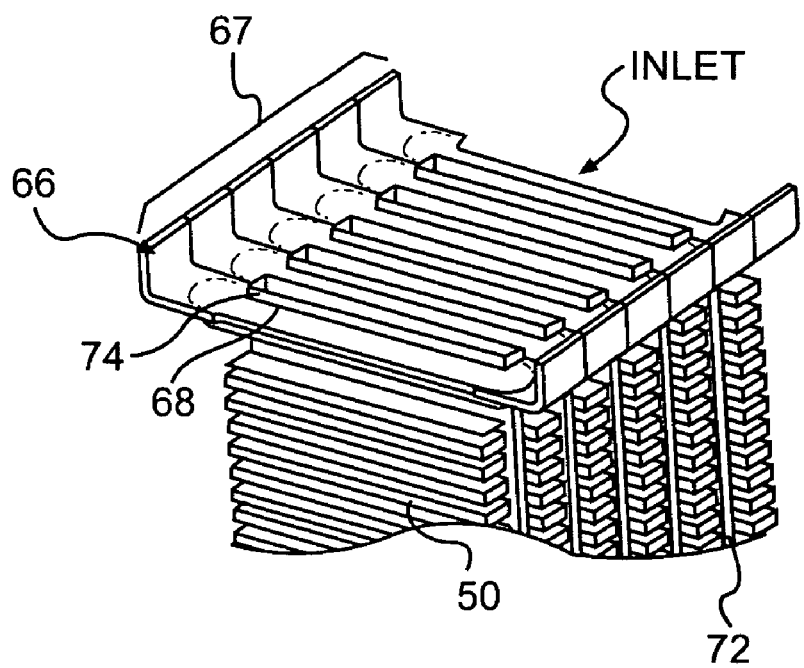
Figure 10C:
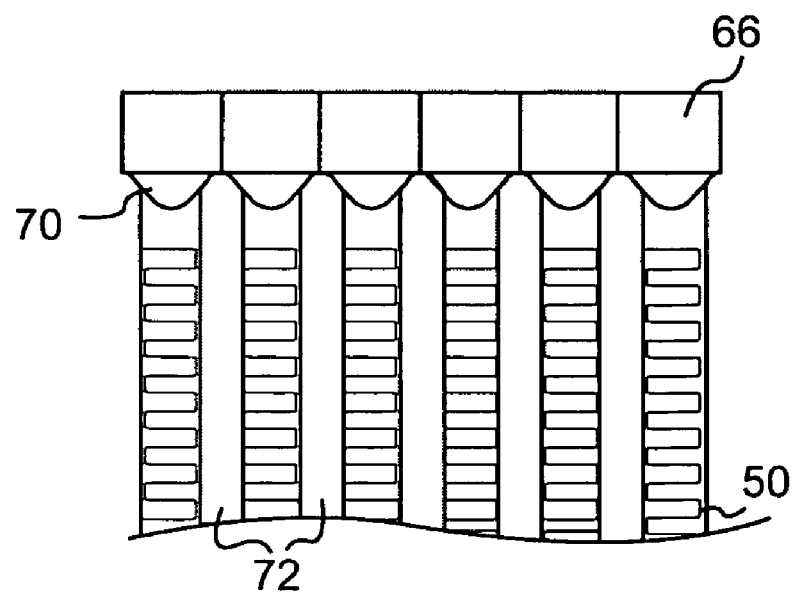
Figure 10D:
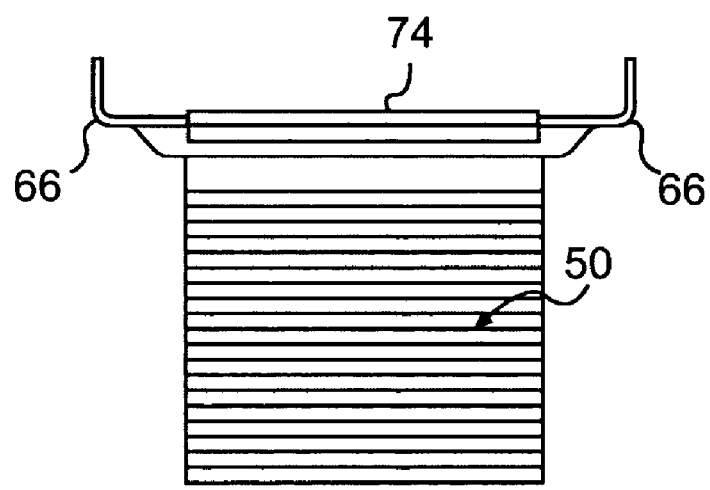

Turning to FIGS. 9A-9D, an exemplary embodiment of a modular type header 66 is shown. In one embodiment, modular header 66 may include aluminum with a brazing layer. A successive number of modular headers 66 may be placed in abutment to form a modular header assembly 67 (FIGS. 10A-10C). As shown, for instance, in FIG. 10A, direction arrows indicate how modular headers 66 may be placed in abutment to form modular header assembly 67 (FIG. 10B). Once the successive number of modular headers 66 are placed in abutment, a brazing operation may be performed to secure abutting surfaces of the modular headers together.

In some embodiments, a dimple 70 may be provided in modular header 66 to provide an added measure of strength to the overall header design. Modular headers 66 may also include machined slots 68 such as for receiving an end portion 74 of final tube assembly 72 in a final assembly. As shown in FIGS. 10A-10D, end portions 74 of final tube assemblies 72 are shown disposed within machined slots 68 of modular headers 66. Once the end portions 74 are disposed within machined slots 68, a brazing operation may be performed to provide a rigid connection, such as between modular headers 66 (e.g., including aluminum with a brazing layer) and end portions 74 (e.g., including aluminum cladded stainless steel).

Figure 12A:
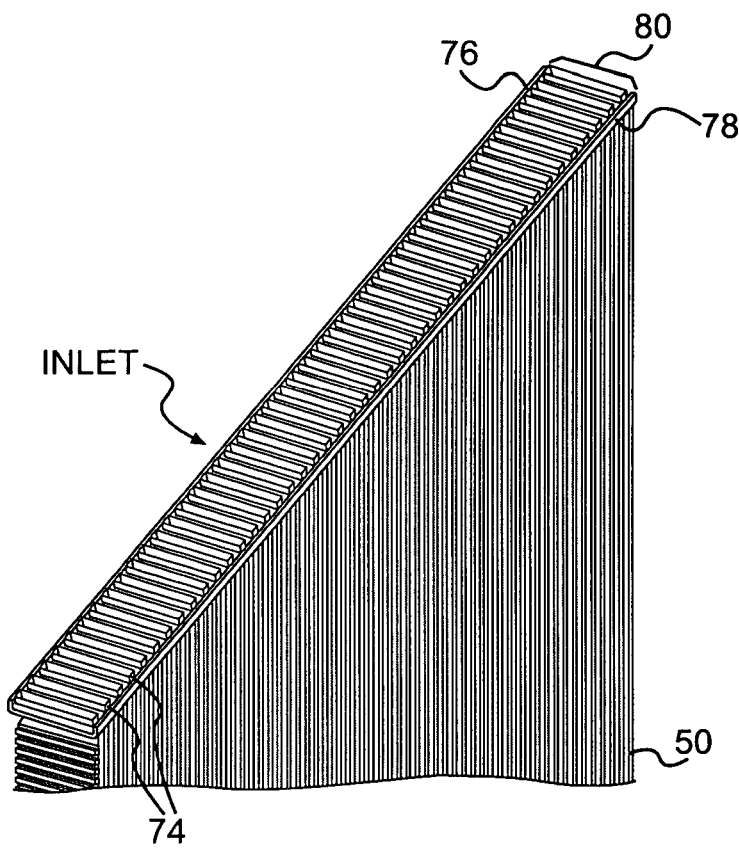
FIGS. 12A-12B provide diagrammatic views of the split header and core assembly of the air-to-air aftercooler according to an exemplary disclosed embodiment.
Figure 12B:
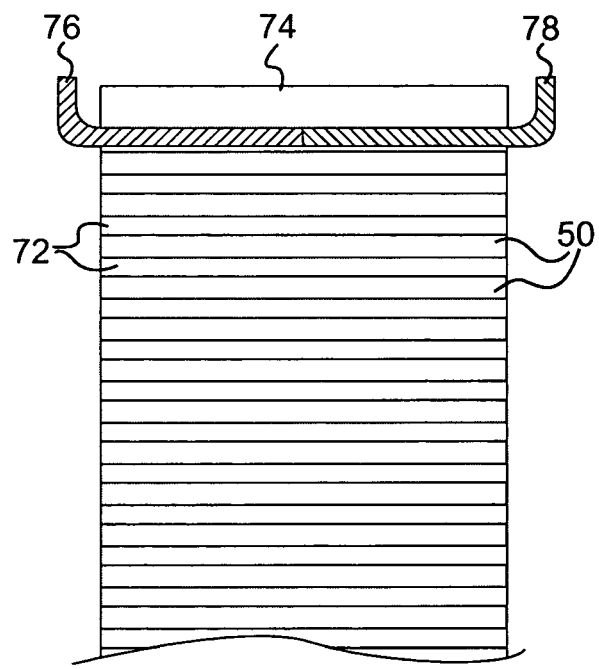

Turning to FIGS. 11A-11D, an exemplary embodiment of another modular header design is shown. In this embodiment, the modular header is a split type header. Similarly, the split type header may include aluminum with a brazing layer. A first header part 76 and a second header part 78 depicting a first half and a second half, respectively, may be joined to form a split header assembly 80. As shown, for instance, in FIG. 11A, directional arrows indicate how first header part 76 and second header part 78 may be placed in abutment to form split header assembly 80 (FIG. 11B). This assembly type facilitates assembly of the ATAAC by providing first header part 76 having multiple machined slots 77 for partially receiving respective end portions 74 of final tube assemblies 72 therein. Machined slots 79 of second header part 78, likewise, may also partially receive respective end portions 74 of final tube assemblies 72. As first header part 76 and second header part 78 are abutted in a complementary fashion to form a unitary header assembly or split header assembly 80, machined slots 77, 79 align to form machined slot 82 which fully receives end portions 74 of final tube assemblies 72 (as shown, for examples, in FIGS. 12A-12B). Once end portions 74 (e.g., aluminum cladded stainless steel) of final tube assemblies 72 are assembled within machined slots 82 of split header assembly 80 (e.g., aluminum with a brazing layer), a brazing operation may be performed to rigidly connect the components.

As previously discussed, the brazing operation simplifies the manufacturing process of ATAAC 36 by reducing assembly times in more simplified or reduced brazing operations. For example, a final turbulator assembly may be disposed within final tube assemblies 72. End portions 74 of each final tube assembly 72 may be disposed in machined slots 68 (of modular header assembly 67) or 77, 79 (of split header assembly 80). Fins 50 may be abutted with final tube assemblies 72. Hence, each of the final turbulator assemblies within final tube assemblies 72, the final tube assemblies 72, the modular header assembly 67 or split header assembly 80, and fins 50 may be joined together in one brazing operation to form ATAAC 36 (as opposed to individually assembling each of the components together). This method of manufacture simplifies construction of ATAAC 36 by reducing an amount of assembly steps and any associated costs which would otherwise be attributable for performing those steps. Moreover, the resulting structure of ATAAC 36, in accordance to the present disclosure, may also provide increased strength of rigid connections of the components, thus, ensuing increased strength of the final assembly. This structure may also be less susceptible to corrosion effects in operation and provide an ATAAC 36 assembly within prescribe weight tolerances.

Figure 13B:
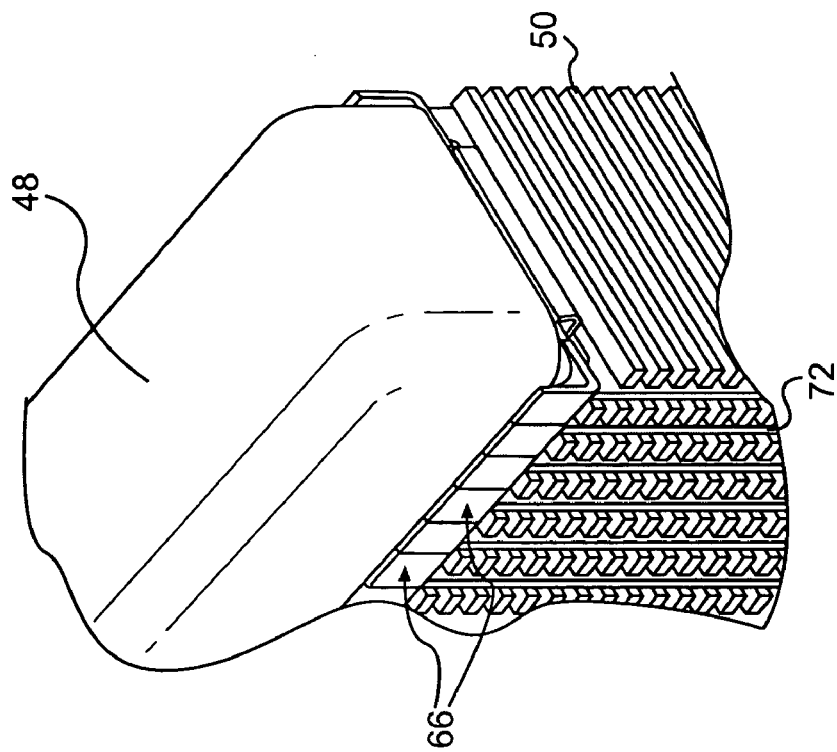
FIGS. 13A-13B provide diagrammatic views of the modular header assembly and an aluminum tank according to an exemplary disclosed embodiment.
Figure 13A:
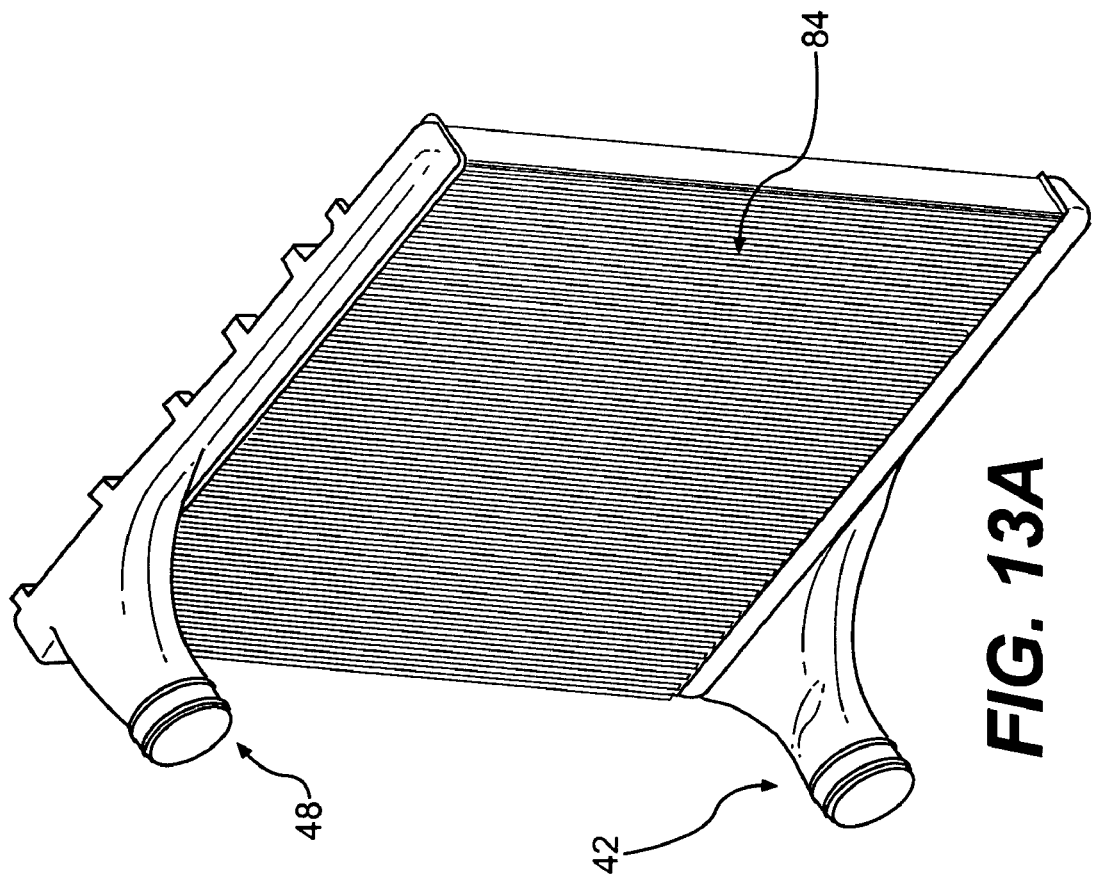

Turning to FIGS. 13A-13B, a manifold assembly may be connected to modular header assembly 67 including modular headers 66. In one embodiment, inlet manifold 42 and outlet manifold 48 are welded to modular headers 66 to facilitate forming a final assembly of the disclosed ATAAC.

Figure 14B:
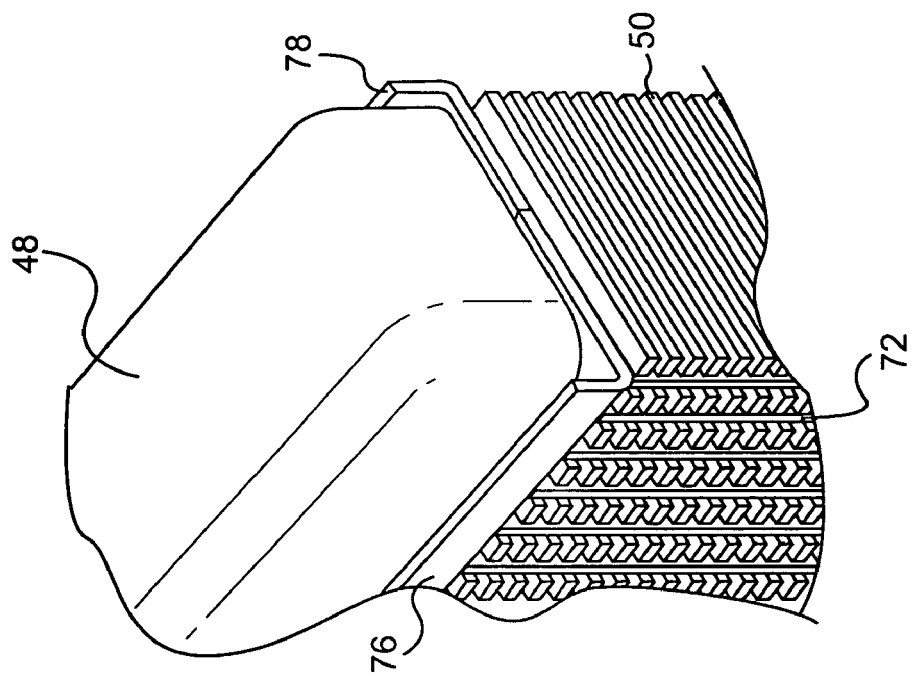
FIGS. 14A-14B provide diagrammatic views of the split header assembly and an aluminum tank according to an exemplary disclosed embodiment.
Figure 14A:
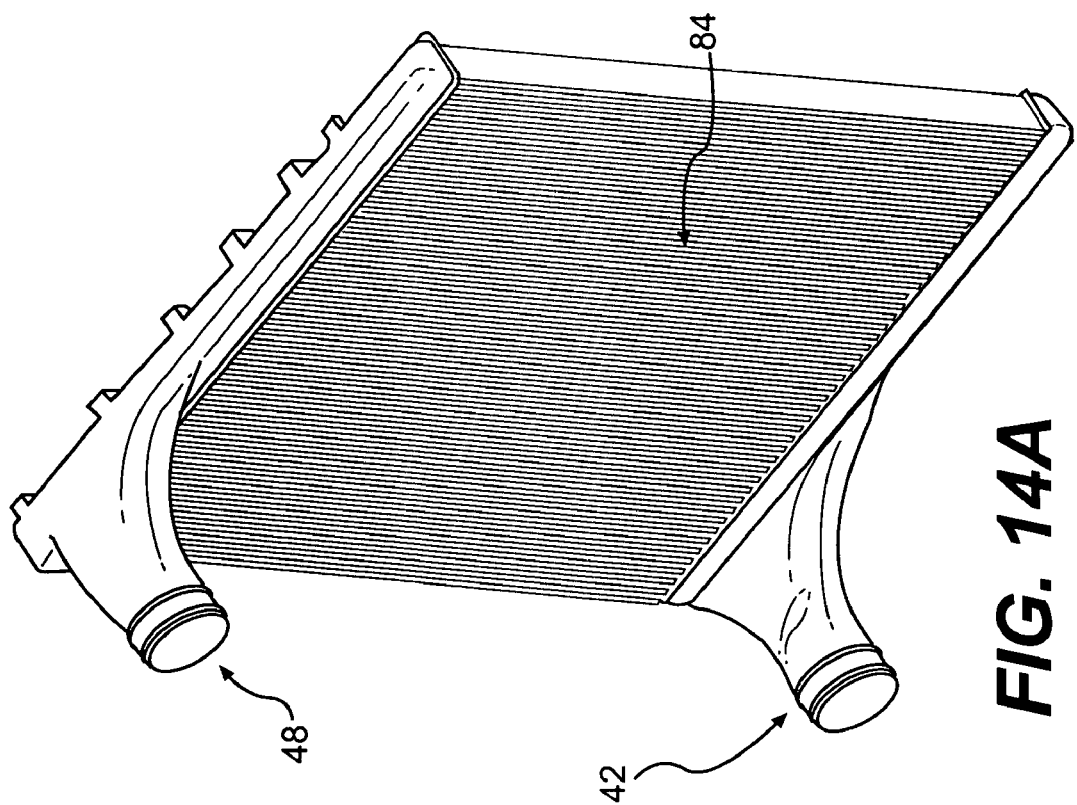

Turning to FIGS. 14A-14B, a manifold assembly may be connected to split header assembly 80. In one embodiment, inlet manifold 42 and outlet manifold 48 are welded to split header assembly 80 to facilitate forming a final assembly of the disclosed ATAAC.

INDUSTRIAL APPLICABILITY

The disclosed ATAAC may have applicability in any system requiring the cooling of a fluid. For example, the disclosed ATAAC may be used in connection with internal combustion engines. In particular, and as shown in FIG. 2, ATAAC 36 may serve to cool a flow of intake air 38a exiting a compressor 30 of a turbocharger 26 before it enters an intake manifold 32 of an engine 24, thus decreasing the level of emissions and increasing the life of engine components.

In a machine 10, exhaust 34 leaving engine 24 may be directed towards a turbine 28 of turbocharger 26. The flow of exhaust 34 may power turbine 28, causing it to rotate and drive compressor 30. Intake air 38a may be directed into compressor 30 where it may undergo compression, and as a byproduct of compression, intake air 38a may also be heated into heated charged air 38b. Heated charged air 38b may travel from compressor 30 into ATAAC 36 through an inlet 40, where it may be directed into an intake manifold 42. As shown in FIG. 4, tubes 44 may be in fluid communication with intake manifold 42 of ATAAC 36, and thus, heated charged air 38b may pass from intake manifold 42 into tubes 44. To assist in the heat transfer, tubes 44 may each have one or more turbulators 62, 64 (FIG. 8) configured to provide turbulence to the flow of heated charged air 38b passing through tubes 44. Turbulence created by turbulators 62, 64 may assist in preventing development of a radial temperature gradient within tubes 44 by mixing all of the regions of heated charged air 38b together, which may result in increased heat transfer between heated charged air 38b and tubes 44. External fines 50 may be bonded to tubes 44 to increase an external surface area of tubes 44, thus aiding in heat transfer. Tubes 44 may direct cooled charged air 38c into outlet manifold 48 towards outlet 46. Upon exiting ATAAC 36, cooled charged air 38c may be mixed with fuel within one or more combustions chambers within engine 24. Because cooler air has greater density than heated air, a volume of cooled charged air 38c at a certain pressure may contain a greater number of air molecules than the same volume of heated charged air 38b at that same pressure. Increasing the number of air molecules in combustion chambers of engine 24 may decrease the amount of smoke and/or emissions exiting from engine 24. Also, reducing the temperature of heated charged air 38b may decrease the operating temperature of engine 24, thus resulting in less wear on engine components.

As noted above, the selected materials of the disclosed ATAAC 36 system may also provide advantages. For example, the majority of components in traditional heat exchange systems are typically formed of an aluminum material. These aluminum components, such as tubing connected to header assemblies, may be susceptible to corrosion over a period of time. In the disclosed embodiment, stainless steel material may be utilized within ATAAC 36 in order to provide an amount of corrosion resistance to the overall design of the heat exchange system. The use of lighter materials, such as aluminum, for other components of the ATAAC 36 may be desirable, for instance, to maintain a weight requirement of ATAAC 36. Additionally, constructing additional components from aluminum material may also facilitate achieving a desired cooling performance of ATAAC 36. Selection of materials for various components, including, for example, tubes 44, headers 54, and external fins 50, may vary based upon an overall consideration of the final ATAAC 36 assembly which balances, for example, a plurality of factors such as weight preferences, cooling performance, and resistance to corrosion.

Hence, one embodiment of the disclosed ATAAC 36 includes a combination of materials including, for example, stainless steel and aluminum components. A mix of stainless steel (e.g., to provide corrosion resistance) in combination with aluminum (e.g., to provide a high cooling performance) may serve to address an overall durability of the ATAAC 36 design while also ensuring a prescribed or practical weight range of the assembled ATAAC 36. The combination of mixed components, such as utilizing stainless steel tubes 44, a stainless steel turbulator 62, an aluminum turbulator 64, aluminum fins 50, aluminum side sheets 52, aluminum headers 67 or 80, aluminum inlet manifold 42, and aluminum outlet manifold 48 may provide superior performance by increasing cooling performance, reducing corrosion, reducing weight, and neutralizing condensation effects within ATAAC 36.

The disclosed ATAAC 36 not only addresses durability concerns, but also provides an improved assembly process for producing heat exchanger system in an efficient manner. This, too, may be facilitated through the selection of materials in the disclosed ATAAC 36 design. For instance, because the selected materials may contain aluminum cladding or a brazing layer, manufacture of the disclosed ATAAC 36 design may be simplified such as by assembling multiple components in one operating process—a process which may be yielded by employing a single brazing operation. This, in effect, may reduce assembly times and tend to increase overall production goals of ATAAC 36 assemblies.

In some embodiments, the brazing operation may supplement other assembly processes including, for example, formation of a final assembly such as ATAAC 36. This may include, for example, providing previously assembled components, such as first C-channel 56 rigidly connected to second C-channel 58 to form unitary tube body 60. (In one exemplary embodiment, a suitable connecting process may include laser-welding.) Hence, a combination of mixed components, such as pre-assembled tube body 60, stainless steel turbulators 62, aluminum turbulators 64, aluminum fins 50, aluminum side sheets 52, aluminum headers 67 or 80, aluminum inlet manifold 42, and aluminum outlet manifold 48, may be assembled and subsequently subjected to a brazing operation. Thus, the brazing operation may be useful in simplifying a final assembly operation for connecting one or more pre-assembled components with some individual components including, for example, ATAAC 36.

Additional advantages provided in the selection of materials for a brazing operation may include producing a final ATAAC 36 assembly at relatively low temperatures for joining dissimilar metal materials. This may reduce or eliminate undesirable metal distortions or warping effects of the assembled components. Since the tensile strength of brazed joints may exceed that of the metals joined, the selection of materials (for example, the aluminum cladding of the stainless steel tubing as well as on the aluminum components) may be important to increasing the overall strength of the ATAAC 36 assembly. Hence, the selection of materials of the resulting structure utilized in the disclosed ATAAC 35 may also provide increased strength to rigid connections of the components. The rigid connections may further ensure an increased strength of the final ATAAC 36 assembly.

Turbulators 62, 64 may also provide added structural strength. As discussed above, first turbulator 62 and second turbulator 64 may be combined to form patterns for a final turbulator assembly within tube 44. Contact between turbulators 62, 64 and internal receiving regions 57, 59 of tube 44 may resist external forces on tube 44 that would otherwise cause tube 44 to inwardly deform. Additionally, internal pressure within tube 44 may be less likely to cause outward deformation of walls of tube 44 when turbulators 62, 64 are secured thereto. As a result, ATAAC 36 may be used in engine assemblies with high charge air pressures. The ability to use higher charge air pressures may provide the added benefits of more complete combustion of fuel, lower emissions, and greater overall engine efficiency.

It will be apparent to those skilled in the art that various modifications and variations can be made in the disclosed ATAAC and methods without departing from the scope of the disclosure. Additionally, other embodiments of the ATAAC will be apparent to those skilled in the art from consideration of the specification. It is intended that the specification and examples be considered as exemplary only, with a true scope of the disclosure being indicated by the following claims and their equivalents.

What is claimed is:

1. An air-to-air aftercooler, comprising:
   at least one tube body configured to direct a flow of charged air, wherein the at least one tube body includes a first material;
   a header assembly coupled to ends of the at least one tube body, wherein the header assembly includes a second different material;
   a first turbulator positioned inside the at least one tube body, wherein the first turbulator includes the first material;
   a second turbulator positioned inside the at least one tube body, wherein the second turbulator includes the second material and wherein the first and the second turbulators are configured to promote mixing of the charged air passing through the at least one tube body;
   fins coupled to an exterior surface of the at least one tube body, wherein the fins include the second material;
   a manifold coupled to each header assembly, wherein the manifold includes a third material different than the first and second materials; and
   a plurality of side sheets coupled to each header assembly, wherein the plurality of side sheets include the third material.

2. The air-to-air aftercooler of claim 1, wherein the header assembly includes modular header components abutted together and forming receiving slots therebetween, the receiving slots configured for accepting ends of the at least one tube body.

3. The air-to-air aftercooler of claim 1, wherein the first material includes stainless steel and the second material includes aluminum.

4. The air-to-air aftercooler of claim 1, wherein the fins are coupled to the at least one tube body by a brazed joint, and the header assembly is coupled to the at least one tube body by a brazed joint.

5. The air-to-air aftercooler of claim 1, wherein the first material includes aluminum cladded stainless steel, the second material includes aluminum with a brazing layer, and the third material includes aluminum.

6. The air-to-air aftercooler of claim 5, wherein the fins are coupled to the at least one tube body by a brazed joint, and the header assembly is coupled to the at least one tube body by a brazed joint.

7. The air-to-air aftercooler of claim 6, wherein the at least one tube body includes a first channel and a second channel coupled together to form the tube body for encapsulating and receiving the first turbulator and the second turbulator.

8. An air-to-air aftercooler, comprising:
   at least one tube body configured to direct a flow of charged air, wherein the at least one tube body includes aluminum cladded stainless steel;
   a header assembly coupled to ends of the at least one tube body, wherein the header assembly includes aluminum with a brazing layer;
   a first turbulator positioned inside the at least one tube body wherein the first turbulator includes aluminum cladded stainless steel;
   a second turbulator positioned inside the at least one tube body, wherein the second turbulator includes aluminum with a brazing layer and wherein the first and the second turbulators are configured to promote mixing of the charged air passing through the at least one tube body;
   fins coupled to an exterior surface of the at least one tube body, wherein the fins include aluminum with a brazing layer; and
   a manifold coupled to each header assembly, wherein the manifold includes aluminum.

9. The air-to-air aftercooler of claim 8, wherein the header assembly includes modular header components abutted together and forming receiving slots therebetween, the receiving slots configured for accepting ends of the at least one tube body.

10. The air-to-air aftercooler of claim 8, wherein the fins are coupled to the at least one tube body by a brazed joint, and the header assembly is coupled to the at least one tube body by a brazed joint.

11. The air-to-air aftercooler of claim 10, wherein the at least one tube body includes a first channel and a second channel coupled together to form the tube body for encapsulating and receiving the first turbulator and the second turbulator.

12. An air-to-air aftercooler, comprising:
   at least one tube body configured to direct a flow of charged air, wherein the at least one tube body includes aluminum cladded stainless steel;
   a header assembly coupled to ends of the at least one tube body, wherein the header assembly includes aluminum with a brazing layer;
   a first turbulator positioned inside the at least one tube body wherein the first turbulator includes aluminum cladded stainless steel;
   a second turbulator positioned inside the at least one tube body, wherein the second turbulator includes aluminum with a brazing layer and wherein the first and the second turbulators are configured to promote mixing of the charged air passing through the at least one tube body; and
   fins coupled to an exterior surface of the at least one tube body, wherein the fins include aluminum with a brazing layer.

13. The air-to-air aftercooler of claim 12, wherein the header assembly includes modular header components abutted together and forming receiving slots therebetween, the receiving slots configured for accepting ends of the at least one tube body.

14. The air-to-air aftercooler of claim 12, wherein the fins are coupled to the at least one tube body by a brazed joint, and the header assembly is coupled to the at least one tube body by a brazed joint.

15. The air-to-air aftercooler of claim 14, wherein the at least one tube body includes a first channel and a second channel coupled together to form the tube body for encapsulating and receiving the first turbulator and the second turbulator.

* * * * *